United States Patent [19]

Cleveland

[11] Patent Number: 5,023,215

[45] Date of Patent: Jun. 11, 1991

[54] CORDIERITE-SILICON NITRIDE BODY

[75] Inventor: Joseph J. Cleveland, Towanda, Pa.

[73] Assignee: GTE Products Corporation, Stamford, Conn.

[21] Appl. No.: 624,500

[22] Filed: Dec. 7, 1990

Related U.S. Application Data

[63] Continuation of Ser. No. 426,644, Oct. 26, 1989, abandoned.

[51] Int. Cl.$^5$ .............................................. C04B 35/58
[52] U.S. Cl. ........................................ 501/98; 501/97; 106/14.05; 264/65
[58] Field of Search ................ 501/97, 98; 106/14.05, 106/14.44, 287.1; 264/65

[56] References Cited

U.S. PATENT DOCUMENTS 4,542,109  9/1985  Pasto .................................... 501/97
4,884,926  5/1989  Iwasaki et al. ...................... 264/65

FOREIGN PATENT DOCUMENTS 58-832052  2/1983  Japan .

Primary Examiner—William R. Dixon, Jr.
Assistant Examiner—Chris Gallo
Attorney, Agent, or Firm—Robert E. Walter

[57] ABSTRACT

A corrosion resistant ceramic article consisting essentially of a first phase of silicon nitride and a second continuous phase of cordierite. The article is formed so that the surface is a substantially continuous oxide material for enhancing the corrosion resistance.

1 Claim, 1 Drawing Sheet

CORDIERITE-SILICON NITRIDE BODY

This is a continuation of copending application Ser. No. 07/426,644, filed on Oct. 26, 1989 now abandoned, entitled "Improved Cordierite-Silicon Nitride Body."

BACKGROUND OF THE INVENTION

This invention relates to a silicon nitride-cordierite composition, article, and process thereof.

Silicon nitride has been developed for use in applications where mechanical and thermal stresses require a material with strength, creep resistance, and low thermal expansion. The engineering/material properties of silicon nitride make it an ideal candidate for areas that place materials in extreme conditions. Engine applications are a typical example of the conditions where silicon nitride is being used. The use of silicon nitride composites for such application is described in C. L. Quackenbush, J. T. Neil, and J. T. Smith, *Sintering Microstructure and Properties of $Si_3N_4$ and siC Based Structural Ceramics*, Paper No. 81-GT-220, Contributed by the Gas Turbine Division of The American Society of Mechanical Engineers for Presentation at the Gas Turbine Conference & Products Show, Mar. 9–12, 1981, Houston, Tex.

For silicon nitride, it has been shown that the development of a uniform $SiO_2$ layer is effective in imparting improved oxidation corrosion resistance. The formation of such a layer is known to be dependent on the composition of the silicon nitride substrate and the specific conditions for its preparation. For example, if a part is given a heat treatment in an oxidizing atmosphere, the $SiO_2$ layer is a function of the purity of the material and the temperature of the heat treatment. See S. I. Raider, R. Flitsch, J. A. Aboof, and W. A. Pliskin, *Surface Oxidation of Silicon Nitride Films*, in the Journal of the Electrochemical Society, Volume 123, No. 4, April 1976, pp. 560–565 and T. Hirai, K. Niihara, and T. Goto, *oxidation of cvd $Si_3N_4$ at 150 to 1650 deg C*, Journal of the American Ceramic Society, Vol. 63, No. 7–8, July–August 1980, pp 419–423.

U.S. Pat. No. 4,542,109 to Pasto relates to a silicon nitride-cordierite article, and process for fabricating is described. The silicon nitride imparts a high mechanical strength, and the cordierite contributes to a lower thermal conductivity making the composition especially useful for internal parts of a diesel engine. The mechanical strength can be increased by crystallizing the continuous cordierite glassy phase of the article. Crystallization of the continuous cordierite glassy phase is accomplished by the addition of a nucleating agent such as zirconium dioxide in the formulation and a subsequent reheating step after densification.

Heretofore, prior art processes for forming silicon nitride-cordierite articles have not concentrated on improving the electrical resistance and corrosion resistance by a particular surface treatment.

SUMMARY OF THE INVENTION

In accordance with of the present invention, there is provided a ceramic article having a continuous oxide coating consisting essentially of a first phase of silicon nitride and a second continuous phase of cordierite. The ceramic article has a substantially continuous oxide surface coating consisting essentially of cordierite and a coating of a reaction bonded silicon oxide.

In accordance with another aspect of the present invention, there is provided a process for making a coated ceramic article. A ceramic article the type consisting essentially of a first phase of silicon nitride, a second continuous phase of cordierite, and a nucleating agent is reacted with oxygen in an oxidizing atmosphere at a sufficient temperature above 1000 degrees Centigrade and for a sufficient period of time to form a substantially continuous surface coating of a reaction bonded silicon oxide.

According, an object of the present invention is to provide a silicon nitride-cordierite articles having improved electrical resistance and corrosion resistance.

Another object of the present invention is to provide an improved process for making silicon nitride-cordierite articles having a surface layer which contributes to improved electrical resistance and corrosion resistance.

Other objects and advantages of the present invention will become apparent from the following detailed description.

DESCRIPTION OF THE PREFERRED EMBODIMENT

Compositions of Cordierite-Silicon Nitride (CSN) are prepared by blending the components together to get a uniform mixture. The particular compositions are prepared by blending the components together to get a uniform mixture. Various blends may be utilized depending on the desired properties of the bulk material. The compositions are formed into articles or shapes using standard forming practice. These shapes are sintered in a furnace to achieve density. Typically, the articles are sintered in a nonoxidizing atmosphere at temperatures above 1500 degrees and preferably below about 1750 degrees centigrade for a period of 1 hour or less. The articles are then checked for net shape. If the particular application requires a fine tolerance, the articles may be machined to the final shape, and then further measured for adherence to a dimensional specification. The machining may introduce microcracks on the surface of the article that allow corrosion or the introduction of corrosive materials into the exposed and microcracked surface of the component. Such corrosive materials may cause increased electrical conductivity along the surface of the article causing failure of the component.

According to the principles of the present invention, a cordierite-silicon nitride article is treated at a temperature and atmosphere that effects a continuous coating of $SiO_2$ on the surface of the CSN article. This step is performed on the final article after sintering to density and machining to final dimensions. The final articles are placed in a furnace that has an oxidizing atmosphere. The treating process is carried out at a temperature above 1000 degrees centigrade for a period of time resulting in the formation of a uniform $SiO_2$ coating on the surface. Temperatures that are too low, in the range of 1000 degrees C. or lower, for example, do not allow the formation of a continuous $SiO_2$ surface. Temperatures that are too high, or in the range of 1700 degrees C. or higher, for example, may cause the formation of SiO which can cause blistering on the surface of the component. The purity of the article or component and the composition of the sintering atmosphere is important in the formation of the desired high purity $SiO_2$ surface for the maximization of the oxidation, corrosion resistance, and electrical resistivity of the final article.

The preferred ceramic article has a composition which comprises silicon nitride and cordierite with an approximate formula of $(Si_3N_4)$ (1-x) $(2MgO.2Al_2O_3.5SiO_2)$ x, wherein x is from about 0.2 to about 0.5, preferably.

The preferred process is as described in U.S. Pat. No. 4,542,109 to Pasto. Silicon nitride, magnesium oxide, silicon dioxide, aluminum sesquioxide, and a nucleating agent are blended to form a powder mixture. The powder mixture is densified to form a densified ceramic article having a crystalline silicon nitride first phase, and a continuous glassy cordierite second phase. After an initial densification, the glassy phase is preferably crystallized to form a rigid, molded densified ceramic article. It is also contemplated that the cordierite portion of the body may be formed from a previous formed codierite body that has been comminuted to a powder. Cordierite may be formed by an appropriate mixture of talcs.

Cordierite is represented by the formula $2MgO.2Al_2O_3.5SiO_2$ and silicon nitride by $Si_3N_4$. The first phase of silicon nitride is a dispersed phase within the continuous cordierite phase. The silicon nitride imparts a high mechanical strength and the cordierite lowers the thermal conductivity making the composition especially useful for internal parts of an adiabatic diesel engine. The compositions lend themselves to consolidation by hot-pressing, cold pressing, or other cold forming processes such as injection molding or slip casting, and sintering to form a densified ceramic article.

The densified ceramic article preferably has a modulus of rupture greater than 110 KSI (kilopound per square inch) at temperatures about 900° and greater than 35 KSI at temperatures greater than 1000° C. depending on its composition. Since some of the compositions contain a continuous glassy or amorphous cordierite phase, an article can be formed by other techniques, e.g., glass-forming methods. When this glass phase is present in the final article, it is preferred to crystallized such phase by the addition of a nucleating agent such as $ZrO_2$ or by a subsequent reheating step in the processing steps. Crystallizing the continuous cordierite phase will increase the mechanical strength of the resulting densified ceramic article.

Certain impurities and additives may be present in the overall composite substrate body. Such further additional materials are preferably present in amounts less than about 5 weight percent of the matrix phase.

Additional materials which might reduce the high temperature strength or thermal shock resistance of the final article are undesirable additives. Additives which may catalyze the decomposition of silicon nitride forming localized high stress area and additives which form low temperature eutectics may all contribute to the reduction in high temperature strength of the final article.

In accordance with the principles of the present invention, the substrate surface is reacted with oxygen in an oxidizing atmosphere to form a layer comprising silicon metal chemically reacted to form silicon oxide. The reactive gas is preferably an oxygen containing gas although it is contemplated that other gases may be suitable. It is believed that oxygen reacts with the silicon nitride surface according to the following reaction:

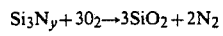

$Si_3N_y + 3O_2 \rightarrow 3SiO_2 + 2N_2$

The gaseous reaction mixture may also include an inert gas such as argon. Preferably, the oxidizing gas comprises from about 10 to about 80 percent by volume oxygen and more preferably from about 15 to about 40 percent by volume oxygen. The reaction gas is characterized by the absence of a carbon source which may preferentially react with oxygen or may form unwanted carbides. The use of nitrogen may result in blisters being formed on the article. Preferably, the temperatures employed are from about 900 degrees centigrade to abut 1600 degrees centigrade and preferably from about 1200 to about 1400 degrees centigrade.

The reaction is preferably carried out under suitable conditions, so that substantially all the silicon oxide present at the surface after reaction is formed by the reaction of silicon nitride in the substrate and the oxidizing gas. The process of the present invention can be typically carried out in apparatus suited for typical vapor phase reactions. The reactant gases are passed over a substrate in a reaction zone. The temperature of the reaction zone, and of the substrate surface, as well as the total flow and composition of the gas phase over the substrate are so selected as to allow the reaction between the gas and the substrate surface to proceed according to the thermodynamic principles. The total flow conditions and the total gas pressure are so selected as to allow the products of the reaction to be removed continuously from the reaction zone. The resulting surface is preferably uniform and homogeneous to the extent that the silicon nitride surface sites are coated with silicon oxide. The coating is preferably at least about one micron in thickness and more preferably from about 2 to about 5 microns in thickness.

EXAMPLE 1

Substrates of hot-pressed cordierite-silicon nitride are placed in a graphite resistance heated furnace at about 1350 degrees C. The substrate consist of 75 percent silicon nitride and 25 percent cordierite and is prepared by the technique described in U.S. Pat. No. 4,542,109 to Pasto. An oxidizing gas consisting of about 20 percent by volume oxygen and the remaining portion with argon. The gas is introduced into the furnace and the reaction is allowed to occur for about thirty minutes.

EXAMPLE 2

The procedure in Example 1 is carried out except that the temperature is about 1100 degrees C. and the time is 60 minutes. During the deposition reaction, an oxide layer appears to grow on the exposed silicon nitride grains. The remitting article has a shiney smooth surface.

EXAMPLE 3

The procedure in Example is carried out except that the temperature is about 1100 degrees C. and the time if 4 hours. A clear deposit of silicon dioxide about 2.5 microns thick is obtained.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

I claim:

1. A process for fabricating a densified coated ceramic article comprising blending silicon nitride, magnesium oxide, silicon dioxide, aluminum sesquioxide, and a nucleating agent to form a powder mixture, said mixture including said silicon nitride, magnesium oxide, silicon dioxide, aluminum sesquioxide, and a nucleating agent in an appropriate amount to form a silicon nitride and cordierite ceramic article having an approximate formula $(Si_3N_4)_{(1-x)} (2MgO.2Al_2O_3.5SiO_2)_x$ wherein x is from about 0.2 to about 0.5, pressing and sintering said powder mixture to form a ceramic article, said sintering being performed at an effective temperature in an inert atmosphere to form a densified ceramic article consisting essentially of a first phase of silicon nitride and a second continuous phase of cordierite and a nucleating agent having a density greater than 95 percent of theoretical density, and reheating said densified ceramic article at an effective temperature for an effective time to crystallize said second continuous phase of cordierite, machining said ceramic article into a final finished shape, reacting said ceramic article having a final finished shape with oxygen in an oxidizing atmosphere at a temperature of from about 1000 degrees C. to about 1700 degrees C. for sufficient period of time to form a substantial continuous surface coating of a reaction bonded silicon oxide on said article, said ceramic article having a substantially continuous surface of oxide material being present on said surface, said oxide material consisting essentially of cordierite and coating of a reaction bonded silicon oxide.

* * * * *